US008566270B2

United States Patent
Sainath et al.

(10) Patent No.: US 8,566,270 B2
(45) Date of Patent: Oct. 22, 2013

(54) SPARSE REPRESENTATIONS FOR TEXT CLASSIFICATION

(75) Inventors: Tara N. Sainath, Burlington, MA (US); Sameer R. Maskey, New York, NY (US); Bhuvana Ramabhadran, Mount Kisco, NY (US); Dimitri Kanevsky, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 272 days.

(21) Appl. No.: 13/242,145

(22) Filed: Sep. 23, 2011

(65) Prior Publication Data

US 2012/0078834 A1  Mar. 29, 2012

Related U.S. Application Data

(60) Provisional application No. 61/386,015, filed on Sep. 24, 2010.

(51) Int. Cl.
  *G06F 17/00* (2006.01)
  *G06N 5/02* (2006.01)

(52) U.S. Cl.
  USPC .............................................. 706/50; 706/20

(58) Field of Classification Search
  None
  See application file for complete search history.

(56) References Cited

U.S. PATENT DOCUMENTS

| 6,212,532 B1 * | 4/2001 | Johnson et al. ............... 715/236 |
| 6,345,119 B1 * | 2/2002 | Hotta et al. ................... 382/225 |
| 6,556,958 B1 * | 4/2003 | Chickering ...................... 703/2 |
| 7,890,549 B2 * | 2/2011 | Elad et al. ..................... 707/803 |
| 8,140,267 B2 * | 3/2012 | Boyer et al. ..................... 702/19 |
| 8,346,774 B1 * | 1/2013 | Kanevsky et al. ............ 707/737 |
| 8,484,023 B2 * | 7/2013 | Kanevsky et al. ............ 704/243 |
| 8,484,024 B2 * | 7/2013 | Kanevsky et al. ............ 704/243 |

* cited by examiner

*Primary Examiner* — Michael B Holmes
(74) *Attorney, Agent, or Firm* — Sunstein Kann Murphy & Timbers LLP

(57) ABSTRACT

A sparse representation method of text classification is described. An input text document is represented as a document feature vector y. A category dictionary H provides possible examples $[h_1; h_2; \ldots; h_n]$ of the document feature vector y. The input text document is classified using a sparse representation text classification algorithm that solves for $y=H\beta$ where a sparseness condition is enforced on $\beta$ to select a small number of examples from the dictionary H to describe the document feature vector y.

15 Claims, 3 Drawing Sheets

SPARSE REPRESENTATIONS FOR TEXT CLASSIFICATION

This application claims priority from U.S. Provisional Patent Application 61/386,015, filed Sep. 24, 2010; which is incorporated herein by reference.

TECHNICAL FIELD

The present invention relates to text classification in Natural Language Processing (NLP) applications.

BACKGROUND ART

Text classification, with a spectrum of applications in Natural Language Processing (NLP) that range from document categorization to information retrieval, is the problem of classifying text documents into topics or pre-defined sets of classes. There has been a tremendous amount of work done on text classification, including techniques based on decision trees, neural networks, nearest neighbor methods, Rocchios method, support vector machines (SVM), linear least squares, Naive Bayes, rule-based methods and more. Some of these methods are unsupervised (no labeled documents—see, e.g., Y. Ko and J. Seo, *Automatic Text Categorization by Unsupervised Learning*, In Proceedings of COLING-00, the 18$^{th}$ International Conference on Computational Linguistics, incorporated herein by reference) while most of the methods assume a set of document or topic labels (see, e.g., Dasgupta et al., *Feature Selection Methods For Text Classification*, in Proceedings of the 13th Annual ACM SIGKDD Conference, 2007, pp. 230-239; T. Joachims, *Text Categorization With Support Vector Machines: Learning With Many Relevant Features*, ECML, 1998; A. McCallum and K. Nigam, *A Comparison Of Event Models For Naive Bayes Text Classification*, in Proc. of the AAAI-98 Workshop on Learning for Text Classification, AAAI Press, 1998, pp. 41-48; incorporated herein by reference).

McCallum and Nigam showed that even a simple supervised classifier can produce acceptable classification accuracy. They showed that text could be classified by assuming conditional independence between words given the labels and by building a Naive Bayes Classifier. The test document can be classified simply by computing the likelihood of the class label given the words of the document based on Bayes' theorem. Although such a trivial method produced promising results, text classification was further improved by Joachims who presented an SVM-based classifier to classify documents which showed that a more sophisticated algorithm can classify documents better than a simple Naive Bayes approach. Since Joachims work, many more supervised algorithms have been proposed for text classification which are described in detail in E. Sebastiani, *Machine Learning In Automated Text Categorization*, CoRR, vol. cs.IR/0110053, 2001, incorporated herein by reference.

In a conventional Naïve Bayes (NB) classification approach, given a test document feature vector y, the a posterior probability for class $C_i$ given y is defined as:

$$p(C_i | y) = \frac{p(C_i) p(y | C_i)}{p(y)}$$

Within the NB framework, the best class is defined as the one which maximizes the posterior probability. In other words, $$i^* = \max_i p(C_i | y)$$

where the terms $p(C_i)$ and $p(y|C_i)$ can be estimated as described below, and where the term p(y) can be assumed to be constant across different classes and so typically is ignored.

The prior probability of class $C_i$ is $p(C_i)$, which can be computed on the training set by counting the number of occurrences of each class. In other words if N is the total number of documents in training and $N_i$ is the number of documents from class i, then $$P(C_i) = \frac{N_i}{N}.$$

The term $p(y|C_i)$ can be computed assuming that document y is comprised of the words $y = \{w_1, w_2, \ldots, w_n\}$, where n is the number of words. A "naive" conditional independence assumption is made on the term $p(y|C_i) = p(w_1, \ldots w_n | C_i)$ and it is expressed as:

$$P(w_1, \ldots w_n | C_i) = \prod_{j=1}^{n} P(w_j | C_i)$$

Each term $P(w_j|C_i)$ is computed by counting the number of times word $w_j$ appears in the training documents from class $C_i$. Typically to avoid non-zero probabilities if word $w_j$ is not found in class $C_i$, add-one smoothing is used. Thus if we define $N_{ij}$ as the number of times word $w_j$ is not found in class $C_i$, we define $P(w_j|C_i)$ as follows, where V is the size of the vocabulary:

$$P(w_j | C_i) = \frac{N_{ij} + 1}{\sum_i N_{ij} + V}$$

The above equations show that instead of making a classification decision on a test document using information about individual examples in training, the Naive Bayes method pools all information about training data to estimate probability models for $P(C_i)$ and $P(w_j|C_i)$.

Besides the improvement in the types of classifiers there has been significant work in feature selection for text classification. Some of these feature selection methods are based on information gain, odd ratio, F-measure and Chi-Square testing (see, e.g., Ko and Seo; F. George, *An Extensive Empirical Study Of Feature Selection Metrics For Text Classification*, Journal of Machine Learning Research, vol. 3, pp. 1289-1305, 2003; incorporated herein by reference). Although the type of feature selection algorithm may vary, it is agreed that feature selection is crucial and improves the performance of a text classifier.

SUMMARY

Embodiments of the present invention are directed to using sparse representations (SRs) for text classification. SRs have been used in other signal processing applications to characterize a test signal using just a few support training examples and allow the number of supports to be adapted to the specific signal being classified. SRs have demonstrated good performance compared to other classifiers for both image classification and phonetic classification, and we extend their use for text classification where their performance varies with the vocabulary size of the documents. SRs provide an alternative class of methods for text classification and offer promising performance compared to standard classifiers used for text classification such as a Naive Bayes (NB) classifier.

In a typical embodiment of the present invention, an input text document is represented as a document feature vector y. A category dictionary H provides possible examples $[h_1; h_2; \ldots; h_n]$ of the document feature vector y. The input text document is classified using a sparse representation text classification approach to solve for $y=H\beta$ and enforcing a sparseness condition on $\beta$ to select a small number of examples from the dictionary H to describe the document feature vector y.

In further specific embodiments, $\beta$ may be determined by Approximate Bayesian Compressive Sensing (ABCS). The text classification algorithm may use a maximum support classification rule that assigns the document feature vector y to a best class i* within the category dictionary H which has largest support in $\beta$. Or the text classification algorithm may use a maximum $l_2$ classification rule that assigns the document feature vector y to a best class i* within the category dictionary H which has largest $l_2$ norm based on a selector $\delta i$ $(\beta) \in \mathfrak{R}^m$ to compute an $l_2$ norm for $\beta$ for a class i as $\|\delta(\beta)\|_2$. Or the text classification algorithm may use a residual error classification rule that assigns the document feature vector y to a best class i* within the category dictionary H which has a smallest residual error based on a selector $\delta i(\beta) \in \mathfrak{R}^m$ to compute a residual error for $\beta$ a for a class i as $\|y - H \delta i(\beta)\|_2$.

Embodiments also include a text classification engine implemented as one or more computer processes functioning in a computer processor and using a method according to any of the above. Embodiments also include a computer program product for text classification implemented in a tangible computer readable storage medium which includes program code for performing a method according to any of the above.

DETAILED DESCRIPTION

In contrast to the Naïve Bayes method for classification, an exemplar-based representation method can be used for text classification based on a Sparse Representation (SR) approach. The motivation for using SRs for text classification is two fold. First, SRs have been successful for face recognition (J. Wright, A. Yang, A. Ganesh, S. S. Sastry, and Y. Ma, *Robust Face Recognition via Sparse Representation*, IEEE Trans. on Pattern Analysis and Machine Intelligence, vol. 31, pp. 210-227, 2009 (incorporated herein by reference) and phonetic classification (T. N. Sainath, A. Carmi, D. Kanevsky, and B. Ramabhadran, *Bayesian Compressive Sensing for Phonetic Classification*, in Proc. ICASSP, 2010, incorporated herein by reference). SRs have been shown to offer improvements over other well-known classification schemes including Gaussian Mixture Model (GMM), Support Vector Machine (SVM) and k-nearest neighbor (kNN) algorithms. Second, SRs adaptively select the relevant support data points from the training data, allowing discriminative classification of the text document with just a few relevant examples of the document corpus.

In formal mathematical terms, in a typical SR formulation a dictionary H is constructed consisting of possible examples of the signal, that is $H=[h_1; h_2; \ldots; h_n]$, where each $h_i \in \mathfrak{R}e^m$. H is an over-complete dictionary such that the number of examples n is much greater than the dimension of each $h_i$ (i.e. m<<N). To reconstruct a signal y from H, SR solves the equation $y=H\beta$. A sparseness condition is enforced on $\beta$ such that it selects a small number of examples from H to describe y. In contrast to Sainath et al. above where only a subset of training examples was selected to seed H, it may be useful to seed the dictionary H using all training documents. This makes the size of H much larger and also enforces a stronger need for sparseness on $\beta$.

Figure 1:
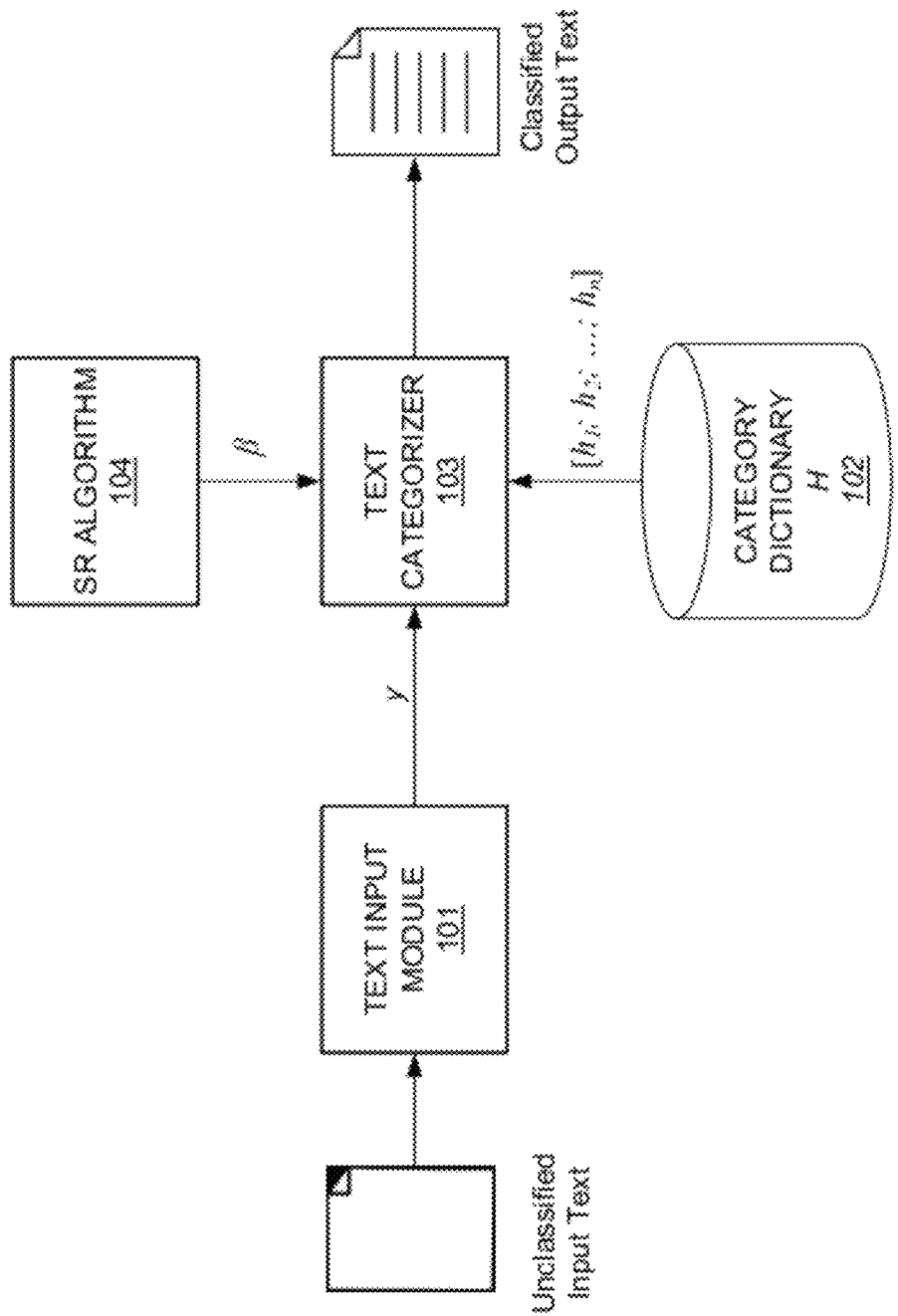
FIG. 1 shows an exemplary embodiment of the present invention for text classification based on Sparse Representation (SR).

FIG. 1 shows an exemplary embodiment of the present invention having a text input module 101 document that represents an unclassified input text as a document feature vector y. A category dictionary H 102 provides possible examples $[h_1; h_2; \ldots; h_n]$ of the document feature vector y. Text categorizer 103 classifies the input text document using a sparse representation algorithm 104 to solve for $y=H/\beta$ and enforcing a sparseness condition on $\beta$ to select a small number of examples from the dictionary H to describe the document feature vector y, thereby producing a classified output text.

The goal of text classification is to use training data from k different classes to determine the best class to assign to test document feature vector y. Initially consider taking all training examples $n_i$ from class i and concatenate them into a matrix $H_i$ as columns. In other words, $H_i = [x_{i,1}, x_{i,2}, \ldots, x_{i,n_i}] \in \mathfrak{R}^{m \times n_i}$, where $x \in \mathfrak{R}^m$ represents the feature vector of a document from the training set from class i with dimension m. For example, one can think of each x as a term-frequency feature where the dimension m corresponds to the size of the vocabulary. Wright et al. shows that given sufficient training examples from class i, a test sample y from the same class can be represented as a linear combination of the entries in $H_i$ weighted by $\beta$. That is:

$$y = \beta_{i,1} x_{i,1} + \beta_{i,2} x_{i,2} + \ldots + \beta_{i,n_i} x_{i,n_i}$$

However, since the class membership of y is unknown, a matrix H is defined to include training examples from all k classes in the training set. In other words, the columns of H are defined as $H = [H_1 H_2, \ldots, H_k] = [x_{l,1}, x_{l,2}, \ldots, x_{k,n_k}] \in \mathfrak{R}^{m \times n_i}$. Here m is the dimension of each feature vector x, and N is the total number of all training examples from all classes. H can be thought of as an over-complete dictionary where m<<N. The test vector y can now be written as a linear combination of all training examples: $y = H\beta$. Ideally the optimal $\beta$ should be sparse and only be non-zero since the elements in H will belong to the same class as y. Thus ideally, y will assign itself to lie in the linear span of examples from the training set of the true class it belongs to.

The following discussion solves the problem $y=H$ subject to a sparseness constraint on $\beta$. As Wright discusses, the sparseness constraint on $\beta$ acts as a regularization term to prevent over-fitting and reduce sensitivity to outliers, and often allows for better classification performance than without sparseness. This is particularly significant when m <<N as explained below. Various specific sparse representation methods can be used to solve the above problem. For example, $\beta$ can be determined by Approximate Bayesian Compressive Sensing (ABCS) (see, e.g., T. N. Sainath, A. Carmi, D. Kanevsky, and B. Ramabhadran, *Bayesian Compressive Sensing for Phonetic Classification*, in Proc. ICASSP, 2010, incorporated herein by reference) which imposes a combination of an $l_1$ and $l_2$ norm on $\beta$.

Having discussed how to solve for β, we now can discuss how to assign y as belonging to a specific class. Various classification rules are available such as maximum support, maximum $l_2$ support, and residual error rules. For example, using a maximum support rule, all nonzero entries of β ideally should correspond to the entries in H with the same class as y. In this ideal case, y will assign itself to one training example from H and y can be assigned to the class which has the largest support in β:

$$i^* = \max_i(\beta)$$

However due to noise and modeling error, β belonging to other classes could potentially be non-zero. Therefore, a maximum $l_2$ classification rule can be used to compute the $l_2$ norm for all β entries within a specific class, and choose the class with the largest $l_2$ norm support. More specifically, a selector $\delta_i(\beta) \in \Re^m$ can be defined as a vector whose entries are non-zero except for entries in β corresponding to class i. The $l_2$ norm for β for class i can then be computed as $\|\delta_i(\beta)\|_2$. The best class for y will be the class in β with the largest $l_2$ norm. Mathematically, the best class $i^*$ is defined as:

$$i^* = \max_i \|\delta_i(\beta)\|_2$$

As Wright discusses, a classification decision can also be formulated by measuring how well y assigns itself to different classes in H. This can be thought of as looking at the residual error between y and the H/β entries corresponding to a specific class. A selector $\delta_i(\beta) \delta \Re^m$ can be defined as a vector whose entries are non-zero except for entries in β corresponding to class i. The residual error for class i can then be computed as $\|y - H\delta_i(\beta)\|_2$ and the best class for y will be the class with the smallest residual error. Mathematically, the best class $i^*$ is defined as:

$$i^* = \min_i \|y - H\delta_i(\beta)\|_2$$

Various experiments have been performed to explore these concepts for text classification using the 20 Newsgroup corpus which consists of 20,000 newsgroup documents that are divided into 20 different classes. 40% of the documents were separated as a held-out test set (roughly 7,532) while the remaining 60% (rough 11,314) were used for training the models. These text documents are quite noisy, for example, email addresses in the headers an hyperlinks and email addresses in the text body.

Various kinds of features have been explored for text classification. For example, the Term Frequency (TF) feature can provide important information about the word distribution relevant for the class label of the document. For example, documents that are labeled as "Hockey" may contain words such as "hockey" and "puck" in higher frequency than words that are related to other sports. Here TF is defined by:

$$TF = \Sigma n_i$$

where $n_i$ is the number of times the $i^{th}$ term occurred in document d.

Typically TF features are often weighted by Inverse Document Frequency (IDF) features which provides even better discriminating property among different classes of documents. However, it has been shown that for the 20 Newsgroup Corpus, using the TF features provides better accuracy than using TF features weighted by the IDF counts. After extracting TF features for all the words in a document, each document was represented with a TF vector of length |V| that is equal to the vocabulary size of the whole corpus, which is 55,710. The experimental embodiment of the SR method needed the number of documents in H(11,314) to be less than the dimension of each TF feature vector (i.e. |V|), so pruning the vocabulary size of TF vectors was explored. This pruning was accomplished by removing words from the vocabulary if the total number of occurrences in training was less than a certain frequency threshold. The NB and SR classifiers we analyzed varying the vocabulary size of the TF vectors from 1,000 to 10,000 in increments of 1,000.

One set of experiments explored the behavior of the β coefficients obtained by solving y=Hβ using ABCS. FIG. 1 shows the β coefficients for a randomly sampled test document y. The 1,400 β coefficients corresponding to 1,400 training document in H were obtained by picking every $8^{th}$ β coefficient from the full set of 11,314 training documents. FIG. 1 shows that the β entries are quite sparse, suggesting that with the SR technique, only a few samples in H are used to characterize y. For example, roughly only 1% of the absolute value of the β coefficients are 0.035. As Wright discusses, this sparsity can be thought of as a form of discrimination where certain documents in H are selected as "good," while jointly assigning zero weights to "bad" documents in H.

The effect of sparseness can be further analyzed by looking at the classification accuracy by solving y=Hβ when enforcing a sparseness on β versus no sparseness. Table 1 compares the results for the two approaches for a vocabulary size of 6,215:

TABLE 1

Classification Accuracy with and Without Sparseness Constraint on β

| Method | Accuracy |
| --- | --- |
| No Sparseness Constraint | 78.8 |
| Sparseness Constraint | 78.6 |

A classification metric defined by a maximum $l_2$ support rule as discussed above. Table 1 shows that enforcing sparseness, and therefore utilizing only a small fraction of examples, provides at least a small improvement in accuracy.

A set of experiments also explored the accuracy with different sparse representation classification metrics. Table 2 shows these accuracies for a vocabulary size of 6,215 and also shows the NB accuracy as a comparison:

TABLE 2

Classification Accuracy for Different Sparse Representation Decisions

| Classification Decision | Accuracy |
| --- | --- |
| NB | 77.9 |
| Maximum Support | 77.2 |
| Maximum $l_2$ Support | 78.8 |
| Minimum Residual Error | 55.5 |

Notice that using Maximum Support as a metric was too hard a decision, as β from other classes was often non-zero. Therefore, making a softer decision by using the $l_2$ norm of β offered higher accuracy. In addition, using the residual error offered the lowest accuracy. Because the features are so sparse, the residual value of $\|\mu y - H\delta_i(\beta)\|_2$ when $\delta_i(\beta) \approx 0$ will reduce to $\|y\|_2$, which is a very small number and might not offer good distinguishability from class residuals in which $\delta_i(\beta)$ is high. Thus, in the remainder of the experiments, the $l_2$ norm of $\beta$ was used to make classification decisions.

Figure 2:
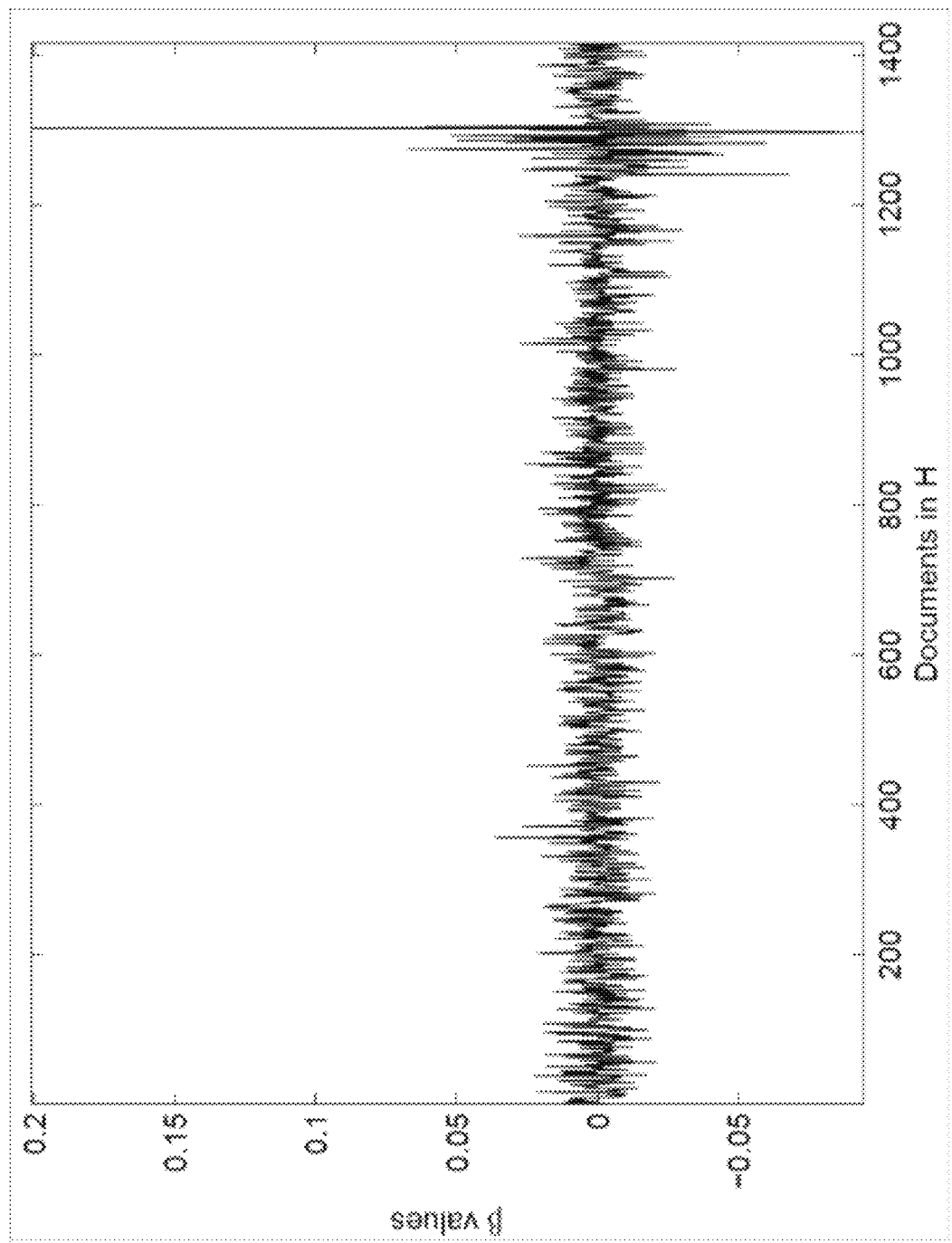
FIG. 2 shows the $\beta$ coefficients for a randomly sampled test document y.
Figure 3:
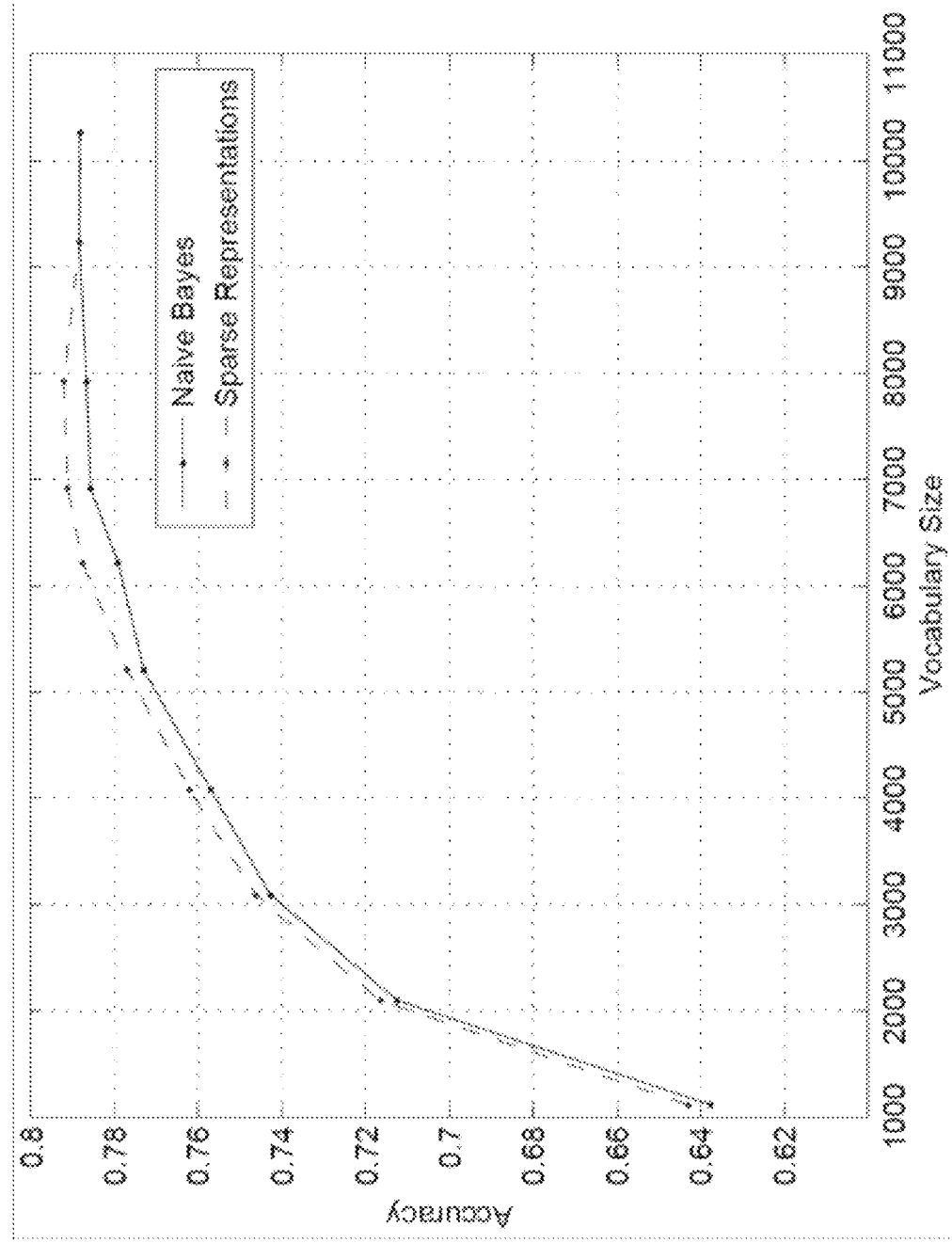
FIG. 3 shows the accuracies of two types of text classifiers for varied vocabulary size.

The behavior of SR and NB methods also was experimentally explored as the vocabulary size was varied from 1,000 to 10,000. FIG. 2 shows the accuracies of the two types of text classifiers for varied vocabulary size. FIG. 2 shows that accuracy of both classifiers increased as the vocabulary size increased. The larger vocabulary size allowed more features to be used in discriminating the documents across different classes. Between a vocabulary size of 1,000 and 8,000, the sparse representation method offered between a 0.3-0.8% absolute improvement compared to NB, and a McNemar's significance test also confirmed that this difference was statistically significant. When the vocabulary size increased beyond 8,000, the accuracy of the SR method dropped and approached that of the NB method. This can be attributed to the behavior of the SR technique which requires that the number of training documents N be much less than the vocabulary size m. As m approaches N, the SR method has less freedom to choose $\beta$ since there are more systems of equations to solve when computing $y = H\beta$. Thus sparsity becomes less beneficial and the SR accuracy approaches that of a non-sparse solution which as explained above was slightly lower than the SR accuracy when sparsity can be applied. The accuracy of the SR and NB methods above 10,000 was not compared because this would make the SR ineffective since m>N. However, it has been observed that the accuracy does not improve significantly when the vocabulary size is greater than 10,000.

The foregoing indicates that sparse representations can be used in Natural Language Processing (NLP) tasks such as text classification. Experimental results show that an SR method offers some improvements over a standard Naive Bayes (NB) classifier across varying vocabulary sizes. Though the tested SR method may not have performed better than state of the art text classification techniques, the preliminary results show that SRs can be effectively used for text classification. In other settings, SRs may be more useful for text classification with better feature selection techniques. SRs may also be considered and compared to Support Vector Machines (SVMs) as has been done for phonetic classification.

Embodiments of the invention may be implemented in whole or in part in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed; it should be apparent to those skilled in the art that various changes and modifications can be made which will achieve some of the advantages of the invention without departing from the true scope of the invention.

What is claimed is:

1. A sparse representation-based text classification engine employing at least one hardware implemented computer processor and comprising:
   a text input module that receives an input text document and represents it as a document feature vector y;
   a category dictionary H of possible examples $[h_1; h_2; \ldots; h_n]$ of the document feature vector y; and
   a text classifier that receives the document feature vector y and accesses the category dictionary H to automatically classify the input text document based on a sparse representation text classification approach to solve for $y = H\beta$ and enforcing a sparseness condition $\beta$ to select examples from the dictionary H to describe the document feature vector y.

2. A text classification engine according to claim 1, wherein the text classifier determines $\beta$ by Approximate Bayesian Compressive Sensing (ABCS).

3. A text classification engine according to claim 1, wherein the text classifier uses a maximum support classification rule that assigns the document feature vector y to a best class i* within the category dictionary H which has largest support in $\beta$.

4. A text classification engine according to claim 1, wherein the text classifier uses a maximum $l_2$ classification rule that assigns the document feature vector y to a best class i* within the category dictionary H which has largest $l_2$ norm based on a selector $\delta i(\beta) \in \Re^m$ to compute an $l_2$ norm for $\beta$ for a class i as $\|\delta i(\beta)\|_2$.

5. A text classification engine according to claim 1, wherein the text classifier uses a residual error classification rule that assigns the document feature vector y to a best class i* within the category dictionary H which has a smallest residual error based on a selector $\delta i(\beta) \in \Re^m$ to compute a residual error for $\beta$ for a class i as $\|y - H\delta_i(\beta)\|_2$.

6. A computer-implemented method of text classification based on sparse representation employing at least one hardware implemented computer processor, the method comprising:
   representing in a computer process an input text document as a document feature vector y;

accessing in a computer process a category dictionary H of possible examples $[h_1; h_2; \ldots; h_n]$ of the document feature vector y; and automatically classifying in a computer process the input text document based on a sparse representation text classification approach to solve for $y=H\beta$ and enforcing a sparseness condition $\beta$ to select examples from the dictionary H to describe the document feature vector y.

7. A method according to claim 6, wherein $\beta$ is determined by Approximate Bayesian Compressive Sensing (ABCS).

8. A method according to claim 6, wherein the text classification approach uses a maximum support classification rule that assigns the document feature vector y to a best class i* within the category dictionary H which has largest support in $\beta$.

9. A method according to claim 6, wherein the text classification approach uses a maximum $l_2$ classification rule that assigns the document feature vector y to a best class i* within the category dictionary H which has largest $l_2$ norm based on a selector $\delta i\ (\beta) \in \Re^m$ to compute an $l_2$ norm for $\beta$ for a class i as $\|\delta i\ (\beta)\|_2$.

10. A method according to claim 6, wherein the text classification approach uses a residual error classification rule that assigns the document feature vector y to a best class i* within the category dictionary H which has a smallest residual error based on a selector $\delta i\ (\beta) \in \Re^m$ to compute a residual error for $\beta$ for a class i as $\|y - H\delta_i\ (\beta)\|_2$.

11. A computer program product for text classification implemented in a tangible computer readable storage medium, the product comprising:

program code for representing an input text document as a document feature vector y;

program code for accessing a category dictionary H of possible examples $[h_1; h_2; \ldots; h_n]$ of the document feature vector y; and program code for automatically classifying the input text document based on a sparse representation text classification approach to solve for $y=H\beta$ and enforcing a sparseness condition $\beta$ to select examples from the dictionary H to describe the document feature vector y.

12. A product according to claim 11, wherein $\beta$ is determined by Approximate Bayesian Compressive Sensing (ABCS).

13. A product according to claim 11, wherein the text classification approach uses a maximum support classification rule that assigns the document feature vector y to a best class i* within the category dictionary H which has largest support in $\beta$.

14. A product according to claim 11, wherein the text classification approach uses a maximum $l_2$ classification rule that assigns the document feature vector y to a best class i* within the category dictionary H which has largest $l_2$ norm based on a selector $\delta i\ (\beta) \in \Re^m$ to compute an $l_2$ norm for $\beta$ for a class i as $\|\delta i\ (\beta)\|_2$.

15. A product according to claim 11, wherein the text classification approach uses a residual error classification rule that assigns the document feature vector y to a best class i* within the category dictionary H which has a smallest residual error based on a selector $\delta i\ (\beta) \in \Re^m$ to compute a residual error for $\beta$ for a class i as $\|y - H\delta_i\ (\beta)\|_2$.

* * * * *